Patented July 8, 1947

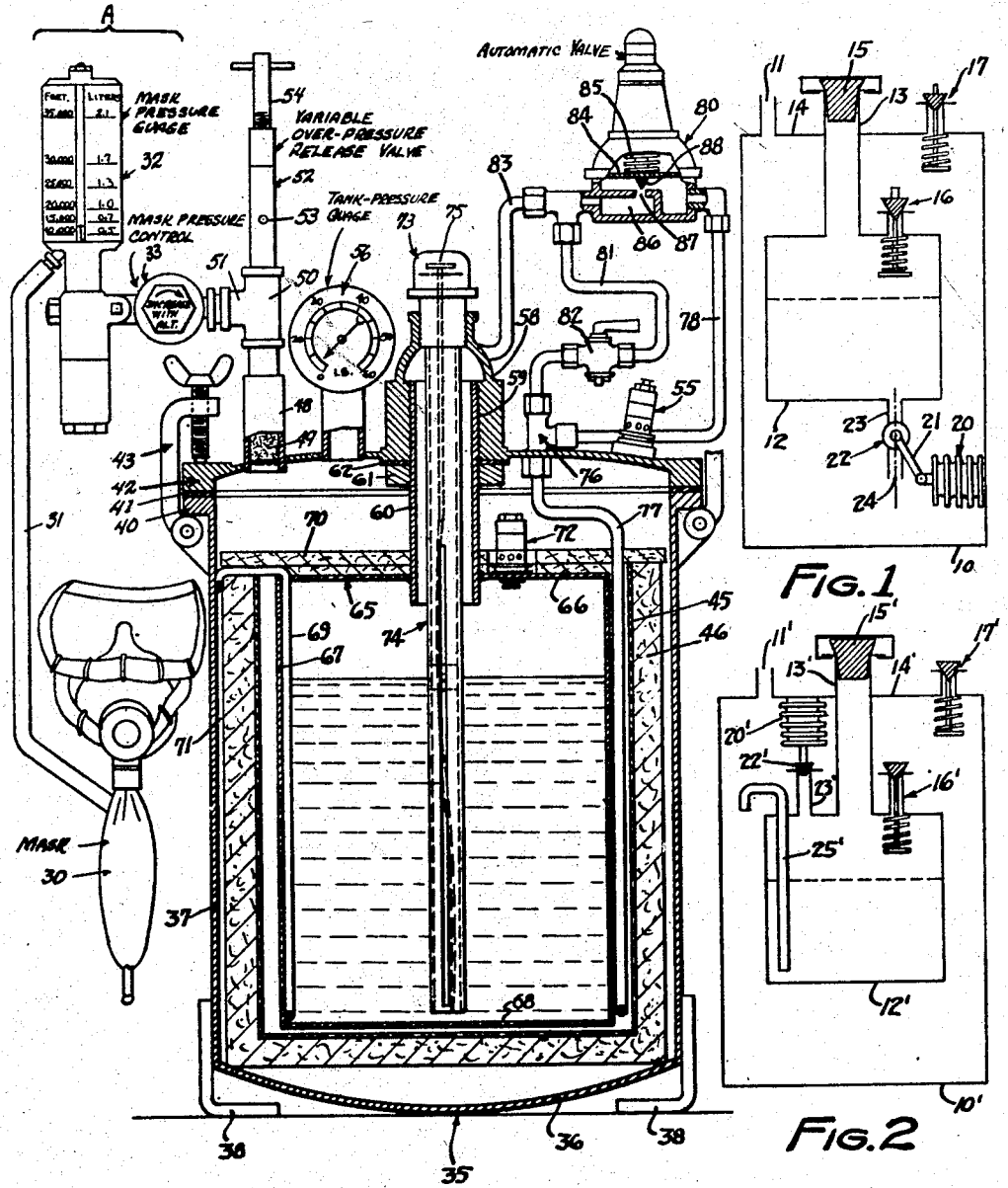

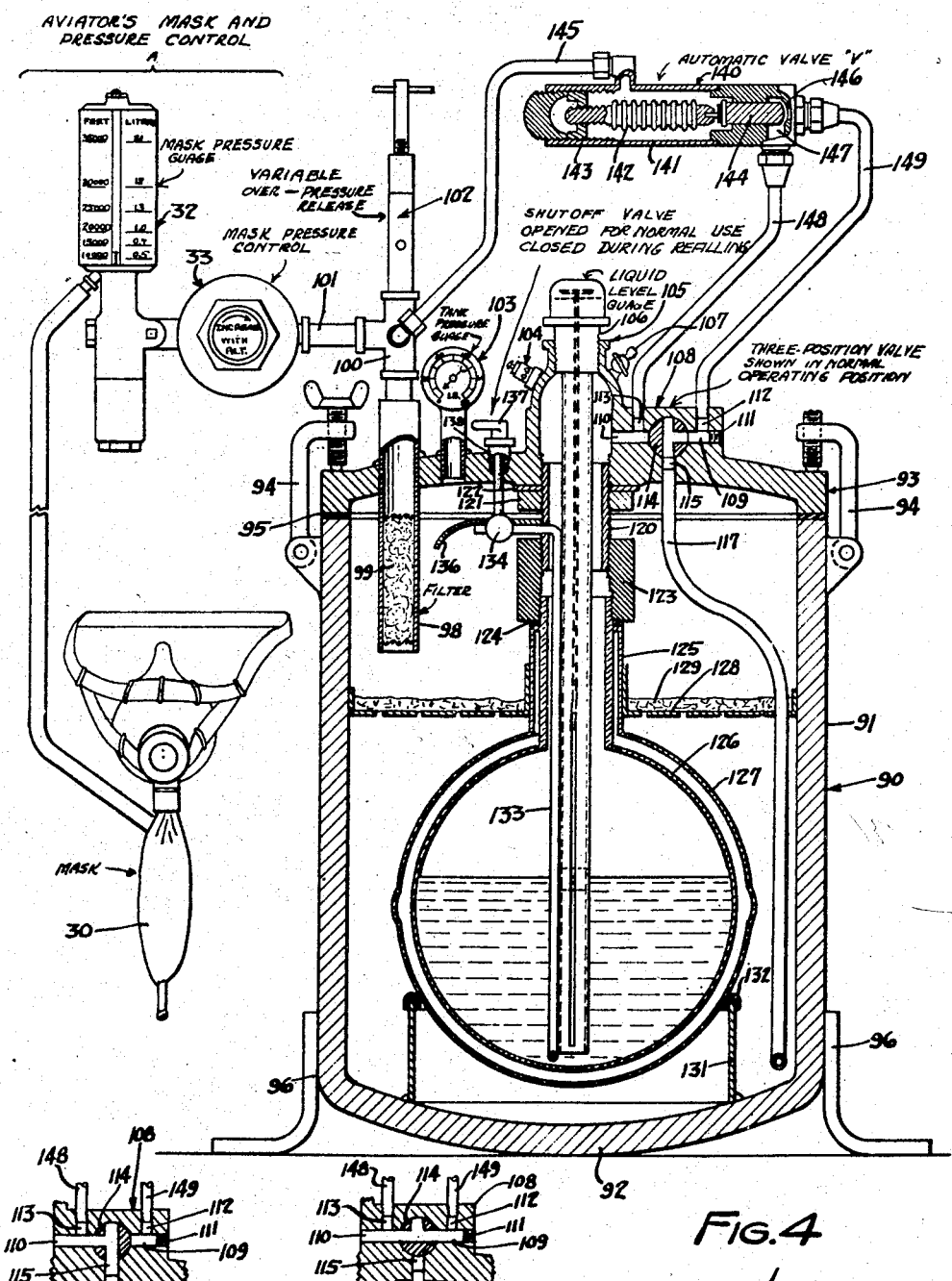

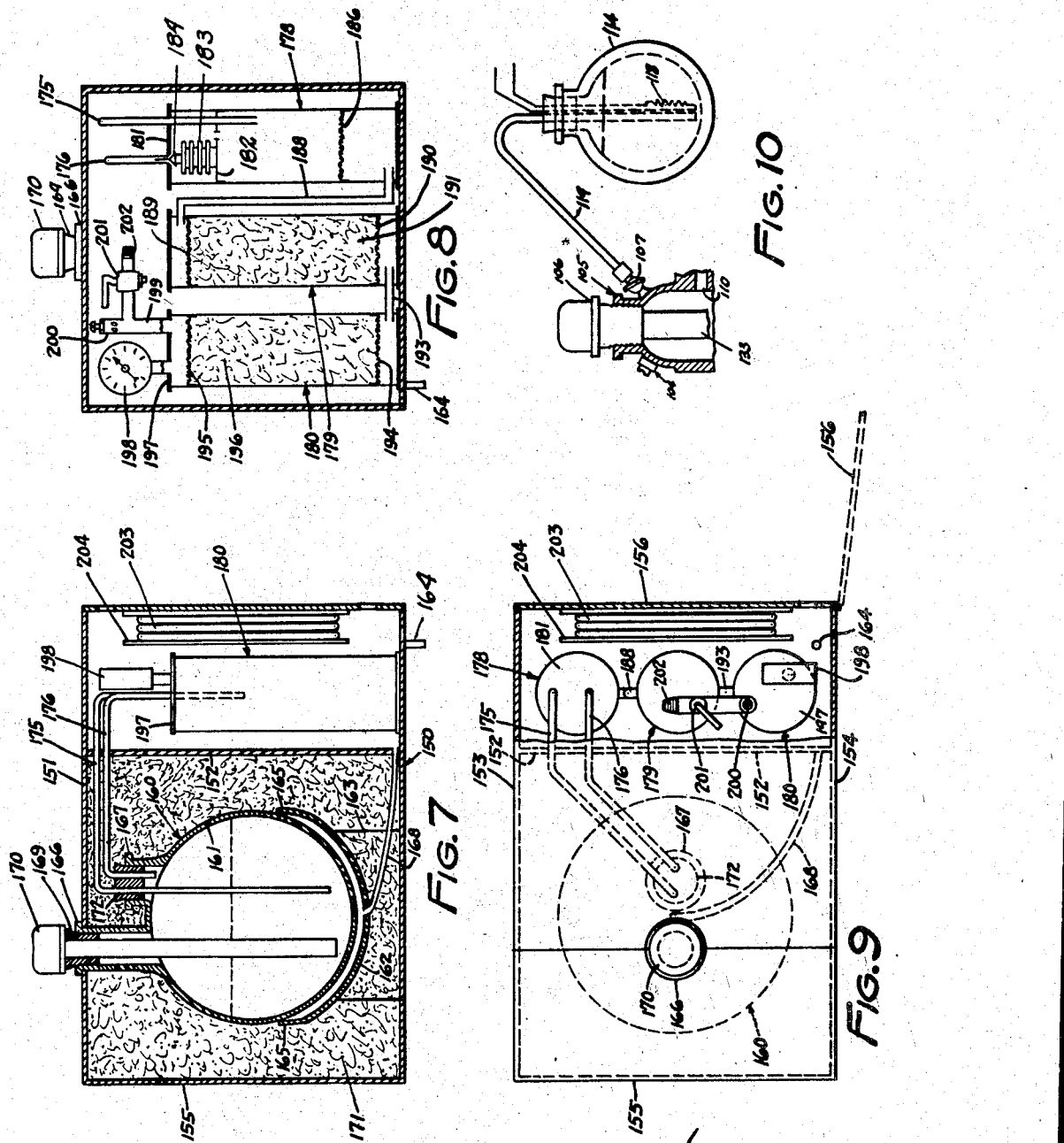

2,423,631

UNITED STATES PATENT OFFICE 2,423,631

CONVERSION APPARATUS

John D. Akerman and Jean F. Piccard, Minneapolis, Minn., assignors to Regents of the University of Minnesota, Minneapolis, Minn., a corporation of Minnesota Application January 26, 1942, Serial No. 428,330

11 Claims. (Cl. 62—1)

This invention relates to an apparatus for converting oxygen from the liquid phase to the gaseous phase at a variable rate in accordance with a variable demand for the gaseous oxygen.

The provision of gaseous oxygen for use in hospitals, aviators' masks, and for analogous uses has long been accomplished by utilizing gaseous oxygen compressed under high pressure into metal bottles of great strength. In order to provide a reasonable amount of oxygen for breathing purposes in an airplane, for example, it is necessary to utilize pressures from 400 to 2,000 pounds per square inch in the oxygen bottle, and even with such equipment, the amount of gas oxygen that may be stored under pressure is limited. In order to provide sufficient oxygen for one man for two hours at 30,000 feet altitude, an oxygen bottle 13¼ inches long and 3 1/8 inches in diameter must be used if the pressure is 1800 pounds per square inch. Such a bottle is, however, under tremendous stress and if hit by a machine gun bullet, it will frequently explode with the destructive force of a bomb. In order to obviate this difficulty the pressure is reduced to a maximum of about 400 pounds per square inch for military use, but this reduces the amount of compressed oxygen to only sufficient for about 25 minutes, for the same size container. Stated another way, an oxygen gas bottle 13¼ inches long and 3 1/8 inches in diameter contains 203 liters of oxygen (measured at normal pressures and temperatures) when the pressure within the bottle is 1800 pounds per square inch, and only 45 liters of oxygen (measured at normal pressures and temperatures) when the pressure within the bottle is 400 pounds per square inch.

One liter of liquified oxygen, on the other hand, produces 1880 liters of gaseous oxygen (measured at normal pressures and temperatures), and this amount is sufficient for one man for approximately 8½ hours at 30,000 feet.

It is an object of the present invention to provide methods and apparatus for converting liquified oxygen to gaseous oxygen in accordance with the variable demand and in a manner such that it is suitable for human consumption for respiratory purposes.

It is a further object of the invention to provide methods and apparatus for converting oxygen from the liquid to the gaseous phase in accordance with the variable demand and under pressure for use either in aviation installations, hospital installations, or at oxygen depots where oxygen gas cylinders are filled under high pressure from existing liquid oxygen stores.

It is a further object of the invention to provide an exceptionally rugged and stable apparatus capable of being used in military aircraft unaffected by gun fire for the provision of oxygen for human respiration.

Other and further objects of the invention are those inherent in the methods and apparatus herein described, illustrated and claimed.

The invention is illustrated with reference to the drawings in which:

Figure 1 is a schematic illustration of an apparatus embodying the invention and capable of carrying out the methods of the invention;

Figure 2 is a schematic illustration of another form of the apparatus of the invention capable of carrying out the methods of the invention;

Figure 3 is a schematic view partly in vertical section illustrating one form of apparatus of the present invention;

Figure 4 is a schematic view partly in vertical section illustrating another form of the invention;

Figures 5 and 6 are fragmentary sectional views of the valving apparatus used in the apparatus of Figure 4 and illustrating the valve in several adjusted positions;

Figures 7, 8 and 9 illustrate another form of the invention in which Figure 7 is a schematic side elevation partly in section, Figure 8 is a schematic end view partly in section, and Figure 9 is a schematic plan view partly in section.

Figure 10 is a fragmentary view of a modified form of filling apparatus.

The methods of the present invention may be carried out in a variety of apparatus of which illustrative embodiments are shown herein.

Referring to Figure 1, the apparatus of the invention comprises an outer pressure container 10 having an oxygen withdrawal port 11 from which the gaseous oxygen is withdrawn as desired for respiratory purposes. It is to be understood that port 11 is connected to a standard pressure-reducing valve so that a pressure of predetermined amount is maintained in container 10. In this connection, it will be realized that the respiratory requirements of an aviator vary widely as the altitude of the craft varies from sea level to ceiling which may be 30,000 feet or more. Accordingly, the rate at which oxygen is withdrawn from port 11 varies widely. Within the container 10, there is a smaller pressure container 12 in which liquid oxygen is stored. Container 12 is supported in any suitable manner and is preferably provided with an inlet tube 13 extending through the upper wall 14 of container 10, the neck 13 being provided with any suitable pressure-tight cover such as clamped cover 15 illustrated.

Container 12 is provided with an over-pressure valve, generally designated 16, which may be of the illustrated spring-loaded type or a weight-loaded type. The outer container 10 is provided with a similar over-pressure valve, generally designated 17. Within the container 10, there is a Sylphon bellows, generally designated 20, which may be evacuated or contain a small amount of residual gas and may be spring-biased if the bellows is not sufficiently strong. The bellows is connected to the operating arm 21 of a shut-off valve, generally designated 22. The valve 22 is in an outlet tube 23 of the inner container 12 and in the position shown in Figure 1, the valve 22 is in the "off" position. However, when the bellows expands so as to bring the operating arm 21 into vertical alignment with the tube along the axis 24, the valve is opened.

The apparatus illustrated in Figure 1 operates in the following manner illustrative of the methods of this invention:

Liquid oxygen is initially poured into the inner container through neck 13 and stopper or cover 15 is then firmly placed into or on the neck effectively preventing escape of gaseous oxygen through the neck. The heat normally inflowing through walls 10 and 12 determines the normal minimum rate of evaporation of the oxygen in reservoir 12 and as the gas pressure within 12 builds up, it will from time to time open the over-pressure valve 16 allowing the oxygen to pass through the valve into container 10 thereby establishing and maintaining a pressure within 10 provided the withdrawal of gaseous oxygen at port 11 is not greater than the minimum rate of evaporation in the system. The pressure normally maintaining within the container 10 is sufficient to compress the Sylphon bellows 20 to the "off" position shown in Figure 1 thereby holding the valve 22 in the closed position. However, when gas is withdrawn from port 11 such as for respiratory purposes and the gaseous oxygen pressure within container 10 is thus reduced, Sylphon bellows 20 expands and opens valve 22 thus permitting liquid oxygen to be spilled directly from container 12 into container 10. The much greater available heat supply of the walls of container 10 produce rapid evaporation of the liquid oxygen thereby quickly reestablishing the normal operating pressure within container 10 with consequent compression of bellows 20. This closes the valve 22 and prevents further spilling of oxygen from container 12 into container 10. This operation is automatically repeated from time to time whenever the pressure within container 10 is reduced below the adjusted minimum for which the Sylphon bellows and valve 22 are adjusted. Suitable adjustments may obviously be provided, both for varying the operating pressure at which Sylphon bellows 20 operates valve 22, and the pressures at which over-pressure valves 16 and 17 are opened.

In Figure 2, the general arrangement is similar to that illustrated in Figure 1 and comprises an outer gaseous oxygen container 10' having a gas withdrawal port 11' and an over-pressure valve 17'. It is to be understood that in service, port 11' is connected to a standard pressure-reducing valve so that even though gaseous oxygen is withdrawn, a predetermined pressure is maintained in tank 10'. From the upper wall 14', there is suspended an inner liquid oxygen container 12', which has a filler neck 13', which is normally plugged by any suitable stopper or cover 15'. Within pressure container 10', there is a Sylphon bellows 20' so as to close the vent tube 23' of the liquid oxygen container 12' when the Sylphon bellows is expanded. An over-pressure release valve, generally designated 16' is provided for the liquid oxygen container, and there is also provided a tube 25' extending from the lower portion of the liquid oxygen container to the upper wall thereof and bent downwardly and terminating above the maximum level of the liquid oxygen within the container 12'. The operation of the apparatus shown in Figure 2 is as follows:

The liquid oxygen container 12' is filled by removal of stopper 15', which is then immediately re-inserted and remains in place during normal operation. The Sylphon bellows 20' may then be collapsed thus opening vent 23' allowing the oxygen vapor to escape to container 10', but if the bellows is in the position shown in Figure 2, pressure builds up within the liquid oxygen container 12' and causes the liquid oxygen level to rise in tube 25' thus permitting liquid oxygen to spill over into the container 10' where it is quickly vaporized due to the large heat input to the container. The amount of liquid oxygen spilled over is sufficient to supply the maximum demands for oxygen withdrawal from tube 11' and establishes a predetermined pressure within the container 10'. Sylphon bellows is adjusted so as to contract at a predetermined pressure thus drawing the valve plug 22' away from the upper end of vent tube 23'.

The oxygen normally evaporated within the liquid oxygen container 12' passes over through the vent 23' until such time as the vent is again closed due to a decrease in pressure in container 10' as occurs when gaseous oxygen is withdrawn from tube 11'. So long as the valve plug 22' is lifted off of tube 23', liquid oxygen within tube 25' remains at the level of the liquid oxygen in the storage tank 12', but whenever the vent 23 is closed responsive to a decrease in pressure in the gaseous oxygen storage tank 10', the oxygen which is evaporated in storage tank 12' at a minimum rate gradually builds up the pressure and gradually forces liquid oxygen upwardly in tube 25' whence it is again spilled over into the tank 10' and quickly evaporated thus again causing the contraction of the bellows 20'. This action is automatically repeated over and over again so long as the liquid oxygen supply is available in the tank 12'. The over-pressure release valve 17' is adjusted so as not to open until a pressure greater than the normal operating pressure of the tank 10' has been exceeded. The over-pressure valve 16' is likewise adjusted so that it does not open until such a pressure is generated within the tank 12' as might occur if the tube 25' becomes plugged and the valve 22'—23' simultaneously clogged.

Referring now to Figure 3, the apparatus illustrated includes an aviators' oxygen mask, generally designated 30, which is connected by supply tube 31 to the aviators' mask-pressure gauge, generally designated 32. The gauge is in turn connected to the mask-pressure control valve, generally designated 33. These elements, the mask 30, the mask-pressure gauge 32 and mask-pressure control 33, illustrated under the bracket A, do not in themselves form any part of the present invention, but merely illustrate a common situation in which the method and apparatus of the present invention give exceptional service and have exceptional utility.

The apparatus illustrated in Figure 3 comprises a gaseous oxygen pressure storage tank, generally designated 35, having a curved bottom wall 36 and cylindrical sidewalls 37. The tank is provided with feet 38, where it is bottom-mounted, or may be provided with any suitable bracket for wall-mounting. The cylindrical sidewalls 37 are provided with a heavy flange 40 which forms a seat for gasket 41 upon which the cover, generally designated 42, rests. The cover is held in place by a plurality of screw clamps, generally designated 43, which may be swung down out of engagement with the cover when the apparatus is disassembled.

Within the container 35, there is positioned a framework 45 of perforated metal, wire cloth, spaced rods or the like, of generally cylindrical shape and smaller than the cylindrical sidewall so as to form a space in which a heavy layer of insulation 46 of mineral wool, kapok or the like is situated. The framework 45 serves as a convenient support for holding the relatively loose and fluffy insulation in place, and the frame and insulation are adapted to remain within the container 35 when the apparatus, mounted upon cover 42, is lifted out.

Cover 42 is provided with a gas outlet tube 48, which may desirably contain a filter 49 of silica gel, activated carbon or both. If desired, the filter 49 may be in the form of a package capable of being inserted from either the inside or the outside of outlet tube 48. The tube 48 is fitted with a T 50 having the outlet portion 51 connected to the aviators' mask-pressure control valve 33.

The T also has connected to it an adjustable over-pressure relief valve, generally designated 52, having an outlet hole 53 and an adjustment screw 54 whereby the loading of the over-pressure valve may be varied for varying the pressure at which excess oxygen is exhausted. The outlet hole 53 is somewhat restricted as compared with the size of pipe 83, valve 80, pipe 78, T 76, and pipe 77, so that when oxygen gas is exhausted at hole 53, there will not be a differential pressure established between tank 65 and tank 35. Stated another way, port 53, when open, exhausts not only the oxygen gas reservoir 35, but also the oxygen gas space above the liquid oxygen in tank 65. Hence, the oxygen gas flowing through pipe 83, valve 80, pipe 78, T 76 and pipe 77 and thence exhausted via reservoir 35, and valve 52, produces a pressure differential between tanks 65 and 35, which might cause liquid oxygen to be spilled over. By making hole 53 small as compared with the pipes 83, valve 80 and pipe 78, the pressure drop through the latter is kept small. Valve 80 should, of course, never be adjusted to be closed at a pressure above the opening pressure of valve 52. Also valve 52 may, as an added precaution, be placed on filler neck 58, if desired. Cover 42 is also provided with a second over-pressure valve, generally designated 55, which is of the ordinary spring-loaded type, this latter valve being set for a higher pressure than valve 52 so as to constitute an added precaution against rupture of the apparatus. The cover is also provided with a tank-pressure gauge, generally designated 56, calibrated in any desired scale.

At approximately the center of the tank cover 42, there is an integral or assembled upward neck 58 threaded on the inside at 59 where it receives correspondingly threaded tube 60. The tube 60 is locked in place by lock nut 61, which seats against the washer 62. The tube 60 extends downwardly into the tank 35 and carries the liquid oxygen storage tank, generally designtaed 65, having the upper wall 66, cylindrical sidewall 67 and the bottom wall 68. The upper wall 66 is provided with an insulated cover 70, preferably of fibre board, and of a diameter so as to match with the outer diameter of the insulation layer 46. The container 65 is pressure-tight and is assembled in pressure-tight relation to the lower end of tube 60, which latter thus constitutes a filling tube for pouring liquid oxygen into container 65, and also as a support by which the container is hung from the cover 42. A liquid oxygen spill-over tube 69 of tank 65 extends from near the bottom 68, upward along wall 67, through the cover 66 and thence through a groove in the upper edge of the framework 45 and insulation 46 to the space 71 between the insulation 46 and the cylindrical wall 37 of the gaseous oxygen storage tank. An over-pressure relief valve 72 is provided for the liquid oxygen storage tank. The upper portion of neck 58 is threaded to receive the cover plug, generally designated 73, which not only serves to stopper the neck 58, but also serves as a mounting for the spiral-type liquid level gauge, generally designated 74, having an indicator needle 75 visible through a dial in the upper portion of the plug 73. The spiral-type liquid level gauge may be of any well-known construction such as used for gasoline tanks and the like.

The cover 42 is also provided with a tubular junction T, generally designated 76, from which there extends a tube 77, bent to extend downwardly, through the insulating cover 70 and thence downwardly along the outside of the liquid oxygen storage tank wall 67. If desired, the tube 77 may be soldered in place on the wall 67 for adding strength and rigidity to the assembly.

From the T 76, there also extends a tube 78, which is connected to the diaphragm side of a diaphragm-operated automatic control valve, generally designated 80. The valve 80 also includes a connection by means of tube 81, which is controlled by shut-off valve 82 and connects with the T 76. The valve further includes a connection by means of tube 83 to the filler neck 58.

Valve 80 includes a diaphragm 84 which is loaded by means of spring 85. The spring is preferably provided with suitable adjustment so that the operating pressure of the valve may be varied. Within the valve housing, there is an antrum chamber 86 having a valve port 87 situated so as to be closed by the diaphragm operated plug 88. When the pressure on the bottom surface of diaphragm 84 is sufficiently low, spring 85 forces the diaphragm downwardly and forces valve 88 into aperture 87 thus closing the automatic valve. When the pressure on the lower side of diaphragm 84 has increased to a predetermined amount (depending upon the adjustment of the valve) diaphragm 84 is flexed upwardly thus opening valve port 87. The automatic valve 80 is then in the position shown in Figure 3. Since the gaseous oxygen may freely pass through insulation 46 and framework 45, the pressure within the storage tank is uniform throughout and is impressed through tube 77, junction T 76, tube 78 upon the underside of diaphragm 84.

The apparatus illustrated in Figure 3 operates according to the following method:

It is assumed that the apparatus has no liquid oxygen within container 65 and is therefore at ambient temperature which is warm as compared with the temperature of liquid oxygen. The filler neck plug 73 (and attached liquid level gauge 74) are removed from the filler neck 58 and a quantity of liquid oxygen is poured through the filler neck thus filling or partially filling the liquid oxygen storage tank 65. The valve 82 is moved to the open position; adjustable over-pressure valve 52 is moved to a position so as to permit exhausting of oxygen at comparatively low pressure and the cover plug 73 and attached gauge are again inserted and made fast. Valve 82, being open, provides a by-pass of large capacity so that the comparatively large amount of gaseous oxygen generated due to the sensible heat of the apparatus, will not overwork valve 80. At first, there is a comparative large evaporation of liquid oxygen and the gaseous oxygen passes up through the filler neck tube 83, by-pass tube 82, junction T 76, and tube 77 to the space between the liquid oxygen storage tank 65 and the framework 45. The gaseous oxygen then filters outwardly in a comparatively uniform manner through the insulation layer 46 and thence, after building up a pressure within the gaseous oxygen storage tank 35, it is exhausted through filter 49 and is either consumed at the oxygen mask 30 or is exhausted through the over-pressure relief valve 52. The valve 52 is then adjusted so as to build up the desired pressure within the tank 35, the pressure being indicated upon gauge 56. After the tank 65 and the remaining adjacent portions of the apparatus have been chilled and their sensible heat withdrawn by evaporation of the liquid oxygen, and after the first large surge of gaseous oxygen has subsided, valve 82 is closed and the evolved oxygen gas passes through tube 83, antrum 86 of automatic valve 80, valve port 87, thence tube 78 to the T 76, and the gas flow continues so long as automatic valve 80 remains open.

For aviation uses, such as high altitude flying, it is desirable to build up a pressure of approximately 60 pounds per square inch, absolute, within the tank 35 so as to provide a uniform pressure upon the liquid oxygen and hence a uniform vaporization temperature. This is desirable to supply a uniform evolution of oxygen during descent of aircraft from very high altitudes such as 30,000 feet or more to lower altitudes.

It may be pointed out by way of explanation that when an aircraft carrying an open container of liquid oxygen increases its altitude, there is a very rapid evolution of oxygen from the open vessel due to the decrease in air pressure at high altitudes. This decrease in air pressure reduces the boiling temperature of the liquified oxygen in the open container. This cools the liquid oxygen, and should the aircraft then start to descend, the cooled oxygen would cease to boil since the temperature of boiling increases with decreases in altitude more rapidly than the chilled liquid oxygen could absorb heat. Consequently evolution of oxygen ceases from an open container of liquid oxygen during the period of descent. Experiments with open containers for producing oxygen supply for aviation purposes have therefore been unsatisfactory because the aviator is deprived of an oxygen supply for a period frequently as much as several minutes during descent from high altitudes. In applicants' apparatus, a nearly constant absolute pressure is maintained on the liquid oxygen. Hence, this cessation in vaporization upon descent of an aircraft does not occur.

Since the oxygen which is vaporized within tank 65 is very cold and is returned to the inner surface of insulation layer 46, the outside passage of such gaseous oxygen through the insulation layer chills the insulation and thus greatly assists in decreasing the rate of heat inflow to the liquid oxygen storage tank 65. For oxygen storage tanks of 20 liters content, the rate of evaporation of liquid oxygen is about 5–10% per hour, depending upon the quality of the insulation layer 46 and the thickness of the layer. This minimum evaporation rate accordingly establishes the minimum rate of evolution of gaseous oxygen of the apparatus and is nearly constant for all temperatures met with in practice.

If it is assumed that the apparatus is used as a source of oxygen for aviation purposes, the aviator adjusts valve 33 in accordance with altitude so as to provide himself with an adequate oxygen supply, and accordingly consumes oxygen which is drawn off of the apparatus through outlet 51. As the pressure within tank 35 gradually decreases, this pressure, being communicated to the underside of diaphragm 84, permits the diaphragm to flex downwardly thus closing the port 87 and closing off the liquid oxygen storage tank 65 from all communication with the gaseous oxygen pressure tank 35 except through tube 69. As the liquid oxygen continues to be vaporized, a slight differential pressure with respect to the pressure of tank 35, is built up within tank 65 and accordingly the liquid oxygen is forced upwardly through the tube 69 until it spills from the outer end of the tube directly into the container 35 where, due to the large amount of sensible heat available, it is quickly vaporized again raising the oxygen gas pressure within tank 35. Consequently valve 80 is again opened when the pressure of tank 35 reaches the predetermined adjusted minimum. When valve 80 is open, the gaseous oxygen evolved in container 65 is permitted to escape into container 35, as previously explained, and liquid oxygen is no longer spilled over through tube 69. The cycling, above described, is repeated from time to time so long as the demand for gaseous oxygen (i. e., withdrawals via tube 48) exceeds the minimum rate of evolution due to the heat inflow to the liquid oxygen storage tank 65. It may be pointed out that since diaphragm 84 of the valve 80 is spring loaded, the pressure at which it operates is not substantially varied by variations in external pressure upon the upper side of the diaphragm. The space above the diaphragm is preferably evacuated to the effect of reducing temperature variation.

Tube 69 terminates outside of the insulation 46 at a level above the maximum level of the liquid oxygen in tank 65. This is important so as to prevent syphoning once the flow of liquid oxygen through tube 69 is started.

In aircraft uses, the apparatus is not always used in the vertical position illustrated in Figure 3 since the aircraft may move freely in its element. This is not disadvantageous to the operation of the apparatus because the plane does not fly upside down for any considerable length of time and the reserve of compressed oxygen gas inside the apparatus is usually sufficient for periods of inverted flight. Furthermore, while the apparatus is in an inverted condition, tube 69 serves as a vent rather than as a liquid oxygen outlet tube and since the liquid oxygen or some of it will be in the uninsulated tube 60 and the filler neck 59, the rate of evolution of gaseous oxygen will be considerably greater during upside down flight than during normal level flight and this gaseous oxygen will be freely vented through tube 69 in such inverted condition. When the apparatus is again brought to the upright position shown in Figure 3, it resumes normal level operation.

The filter 49 is important where the oxygen supply is used for human respiration. It may be pointed out that in the production of liquid oxygen, the compressors used are frequently lubricated with ordinary petroleum products and due to the high temperatures attained during compression a certain amount of oil is carbonized or "burned" and inevitably finds its way into the finished liquid oxygen product. Where the liquid oxygen is permitted to evaporate from a container, the undesirable small fractions of burned oil remain so chilled that they are not normally evaporated while there is liquid oxygen present. However, as the liquid oxygen supply is spilled out, a certain amount of burned oil will likewise be ejected and this amount increases in concentration as the oxygen is evaporated off. The burnt oil odor is very nauseating and is very undesirable where the oxygen is used for human respiration. The filter 49 of silica gel, activated carbon or a combination of both removes these odors and makes the use of the apparatus practical and safe.

The apparatus illustrated in Figures 4, 5 and 6 is especially adapted, not only for aviation use and particularly military aviation use, but may also be used for filling oxygen cylinders with oxygen gas under pressure. As illustrated in Figure 4, the apparatus consists of a heavy walled gaseous oxygen storage tank, generally designated 90, having a heavy cylindrical sidewall 91, a downwardly bulged endwall 92. The tank is provided with a heavy metal cover, generally designated 93, which may be held in place by a plurality of screws or clamps 94. The cover 93 seats upon a gasket 95 or upon a ground or sealed joint depending upon the pressures encountered. Cylindrical sidewalls are provided with feet 96 where the apparatus is bottom-mounted, or may be provided with hangers for wall-mounting, if desired.

The cover 93 is provided with an outlet and filter tube 98 having a filtering material 99 of silica gel, activated carbon or a combination of both for the removal of odoriferous materials. The outlet tube 98 terminates in a junction T 100, having the consumer's tube 101 and a variable over-pressure exhaust valve, generally designated 102, which is of the same type described with reference to the apparatus in Figure 3. The cover 93 is also provided with a tank-pressure gauge, generally designated 103, and with a second over-pressure release valve, generally designated 104, which is set to operate at a pressure above that at which the release valve 102 operates. The valve 104 is mounted upon an integrally cast filler neck 105, which is provided with a combined screw plug and filler gauge 106 of the type described with reference to the apparatus shown in Figure 3.

The cover 93 includes the housing of an integrally cast 3-position valve, generally designated 108, which has a drilled passageway 109 extending into the filler neck as shown at 110. The outer end of the passageway 109 is plugged with a screw 111 and there are drilled branch passages 112, 113 and 115. The valve plug 114 is rotatably mounted in the valve casing 108 and cooperates with the various drilled passageways to provide three different valving conditions. The tubular connection 117 connects to passage 115 and extends to the bottom of a gaseous oxygen pressure tank 90.

Into the filler neck 105, there is threaded a nipple 120, which is held in place by a lock nut 121 seated upon washer 122. The lower end of the nipple has a heavy resilient rubber coupling 123 attached thereto in pressure-tight relation and to the lower end of the nipple, there is attached the neck 124 of a vacuum-wall flask, generally designated 125. The flask may be of any shape but is preferably of a spherical design having an inner wall 126 and an outer wall 127 spaced from each. The space is evacuated so as to form a good heat insulator and where the apparatus is used for military aircraft, the evacuated space is preferably completely devoid of any combustible material such as carbon. Upon the neck of the flask, there is positioned a perforated tray 128 having a porous material 129 thereon for a purpose to be described. The flask is of such dimensions so that when the cover 93 with the flask hanging therefrom is lowered into the tank 90, the flask will rest on a cylindrical support 131, which has a rubber beading 132 at its upper edge. The nipple 120 supports a liquid oxygen spillover tube 133 which extends from the lower portion of flask 125 upwardly through the flask neck, the rubber coupling 123 and then outwardly through an aperture in nipple 120. A shut-off valve is provided at 134 and a deflector plate 136 is included for downwardly deflecting liquid oxygen delivered by tube 133. The valve 134 is provided with an operating handle 137, which extends through a gland 138 in the cover 93.

An automatic valve, generally designated 140, is provided for controlling the conversion of the liquid oxygen to the gaseous oxygen. The valve 140 comprises a casing 141 of gas-tight construction having a sealed Sylphon bellows 142 therein, which may be evacuated, if desired. The Sylphon bellows is provided with an adjustment screw collar 143 by which the pressure at which the Sylphon bellows operates may be varied. Casing 141 is connected by means of tube 145 to the coupling T 100 and hence the pressure within the casing 141 is the same as the gaseous oxygen pressure in tank 90. Sylphon bellows 142 operates upon a sleeve-type valve element 144, which serves to close valve seat 146. The antrum chamber 147 of the valve is connected by tube 148 to the port 113 of the valve 108, and the valve outlet 146 is similarly connected by tube 149 to passage 112 in valve 108.

The valve 108 is capable of being placed in three operative positions illustrated in Figures 4, 5 and 6. The operation of the apparatus is as follows:

It is assumed that the apparatus has no liquid oxygen in it and has been out of service and is therefore at ambient temperature. The tank over-pressure release valve 102 is adjusted to a low pressure and the three-position valve 108 is adjusted to the position shown in Figure 5. The combined plug and liquid level gauge 106 is removed and liquid oxygen is poured into a filler neck until the vacuum flask 125 is full, or nearly full. The liquid level gauge and plug are then re-inserted and screwed down until gas-tight. Due to the sensible heat of the apparatus liquid oxygen initially evaporates at an exceedingly rapid rate thus vaporizing considerable amounts of oxygen which are evolved through the neck of the flask and thence through port 110 through the valve 108, which is, as previously stated, in the initial filling position shown in Figure 5 and thence through tube 117 to the interior of gaseous oxygen pressure tank 90. The gaseous oxygen builds up a pressure in the entire apparatus until it begins to vent at the over-pressure release valve 102 or until use of the oxygen is initiated. The over-pressure release valve is then adjusted to the working pressure of the apparatus which, for aviation purposes, is preferably about 60 pounds per square inch, absolute. When the working pressure is built up, valve 108 is moved to the normal position shown in Figure 4 and the apparatus is in operation.

The insulation of the vacuum-wall flask is very efficient. For a flask of 20 liters capacity, the rate of evaporation due to inflow of heat through the flask walls is approximately 2% or 0.4 liter of liquid oxygen, for each 24 hours, or in other words, a filled 20 liter flask will be empty at the end of 50 days if none of the liquid oxygen is used or spilled. For smaller flasks of say 1 liter capacity, the rate of evaporation is as much as 10% or about 0.1 liter of liquid oxygen for each 24 hours or in other words, the contents of a 1 liter flask will last 10 days if none of the liquid oxygen is used or spilled.

The liquid oxygen thus evaporated by the normal heat inflow as gaseous oxygen passes upwardly through the neck of flask 125, coupling 123, nipple 122 and thence through port 110 of valve 108, which during normal operating conditions, is moved to the position shown in Figure 4. The gaseous oxygen hence passes through port 113, tube 148, through the normally open automatic valve 140, thence through tube 149, port 112, through the valve plug 114, port 115 and thence through tube 117 to the interior of the gaseous oxygen storage tank 90 where it serves to maintain pressure within the tank. If no withdrawals are made, the pressure gradually increases until the over-pressure release valve 102 operates. Over-pressure valve 104 acts as an extra safety valve.

When oxygen is consumed by withdrawal through filter 99 and tube 101, the pressure in the tank decreases, provided the rate of withdrawal is faster than the minimum rate of evolution of oxygen and as the pressure drops to a predetermined minimum the Sylphon bellows 142 of automatic valve 140 expands due to the corresponding decrease in pressure within the casing 141. The Sylphon bellows 142 is sealed and may contain a resilient gas or preferably be evacuated and may expand due to an internal bias spring or natural resiliency of the bellows. The adjustment is such that the bellows operates and moves valve slide 144 to the seated or closed position upon valve seat 146 when the pressure within tank 90 has decreased to a predetermined level. When valve 140 has closed, the gaseous oxygen evolved within tank 125 is no longer vented to the interior of the pressure tank 90 and gradually builds up a differential pressure within the vacuum flask thus causing the liquid oxygen to rise in tube 133 until it is spilled out of the end of the tube and deflected down by deflector plate 136.

The liquid oxygen spills upon the porous material 129 where it is evaporated. It may be noted that the liquid oxygen is very cold as compared with the exterior flask wall 127, and it is therefore desirable not to allow it to fall on to the walls of either container 90 or flask 127 since it might cause the walls to contract and crack. The porous material 129 serves to disperse the liquid oxygen and cause its evaporation without any adverse effect in the vacuum flask. The liquid oxygen thus evaporated rapidly builds up pressure within tank 90 and since tank 90 is connected by pipe 145 to bellows chamber 141, the pressure causes the Sylphon bellows to contract thus opening valve 146, which in turn permits the oxygen vapor pressure in 125 to become equalized with that of tank 90. Liquid oxygen is therefore no longer delivered through tube 133. As the pressure again drops, the cycle of delivering liquid oxygen to the interior of pressure tank 90 for evaporation therein is repeated over and over as long as the supply of liquid oxygen lasts and withdrawals continue.

The filter 99 like the filter 49 in Figure 3, serves to collect and hold all odoriferous materials thus making the supply of gaseous oxygen safe and comfortable for human respiration.

When the liquid level gauge in the plug 106 indicates that the liquid level has decreased to a low level, and it is desired to refill flask 125, this may conveniently be done without interrupting the oxygen supply delivered at tube 101 to the aviator or other person using the apparatus.

The apparatus illustrated in Figures 7, 8 and 9 is especially adapted for supplying oxygen gas from liquid oxygen supply in hospitals and the like, although by suitable modification it may be easily adapted for military uses where armor is of paramount importance. The apparatus consists of a rectangular box, generally designated 150, preferably made of sheet metal, having a top cover 151, an intermediate partition 152, sidewalls 153 and 154, an endwall 155 and a hinged endwall 156. Endwall 156 may be opened during use of the apparatus and may be perforated to allow warm air to come into contact with the apparatus. In the compartment between the intermediate partition 152 and endwall 155, there is supported a storage flask of strong steel, generally designated 160, having a wall 161. The flask is supported upon a dish 162 which is spaced slightly from the wall 161 and touches the flask wall at various places 165 around the upper edge of the dish. The dish and wall are not sealed air-tight. The dish is provided with a drain 168 leading downwardly to the space between partition 152 and endwall 156 and the dish is supported on cylindrical frame 163.

The large compartment between walls 152 and 155 is air-tight except for tube 168 and flask 160 is thoroughly insulated by a packing of kapok, rock wool or glass wool 171. When liquid air is poured into flask 160, it reduces the temperature in the surrounding space, thus causing a contraction of the air within the insulation and a consequent drawing in of air through tube 168. As drawn in, the air impinges upon the extremely cold surface of flask wall 161 and moisture is frozen out and collected between wall 161 and dish 162. Hence, only very dry air filters into the insulation mass. When the apparatus subsequently becomes warm, the moisture in dish 162 is the first to be expelled, and moisture saturated air is expelled through tube 168 until all moisture is removed. Tube 168 drains into the smaller compartment whence it again drains through tube 164, together with water condensed on the apparatus in that compartment.

The flask 160 is provided with two necks, a long neck 166, which extends through cover 151, and a short neck 167 which is within the container. The long neck serves as a filler opening and is capped by a plug 169 which carries a liquid level gauge 170 of the spiral type hereinbefore referred to. The short neck 167 of flask 160 is provided with a stopper 172 through which two tubes extend. One of the tubes 175 extends through the stopper 172 to near the bottom of flask 160 and the other tube 176 extends through the stopper to the upper part of flask 160. Both tubes extend across the upper portion of the apparatus and through the partition 152 as illustrated in Figures 8 and 9, and into the end compartment between partition 152 and the removable cover 156.

Within the end compartment are three cylinders 178, 179 and 180. Each of the cylinders has endwalls which are welded or otherwise held in place. The tubes 175 and 176 extend through the upper cover of the cylinder 178, tube 175 extending about midway into the cylinder while tube 176 terminates at or slightly below the top cover 181 forming a valve seat. Within cylinder 178, there is a cross frame 182 which serves to support a Sylphon bellows 183, which actuates a valve element 184, aligned with the end of tube 176. The Sylphon bellows 183 is sealed and is preferably evacuated and may contain a residual gas or internal spring. The bellows is responsive to the pressure within cylinder 178. As the pressure decreases, the bellows expands and forces the valve element 184 into contact with the valve seat end of tube 176 thereby closing off flow through that tube.

It will be noted that the frame 182 is apertured so that the pressure within cylinder 178 is constant throughout. Below the end of tube 175, there is a cross frame 186 in cylinder 178, which serves to break up and finally disperse liquid oxygen falling thereon. The lower portion of cylinder 178 is connected by means of an oxygen delivery tube 188 to the upper portion of cylinder 179, which has end screens 189 and 190 between which there is a filter packing 191 of silica gel. The lower portion of cylinder 179 is connected by means of an oxygen delivery tube 193 to the lower portion of cylinder 180. Cylinder 180 likewise is provided with screens 194 and 195 between which there is a filter packing 196 of activated carbon. The silica gel and activated carbon filters very effectively collect and hold odoriferous materials thus purifying the oxygen gas so that it may safely be used for human respiration. Other filters for the same purpose may obviously be used in this or any of the apparatus previously described.

The cover 197 of cylinder 180 is provided with a pressure gauge 198 and with an outlet tube 199. The outlet tube 199 carries an over-pressure relief valve 200, and a shut-off valve 201 terminating in oxygen delivery nozzle 202. The space between the row of cylinders 178, 179 and 180 and the door 156 may conveniently be used for a coiled delivery hose 203 held in place on clips 204, if desired.

The operation of the apparatus illustrated in Figures 7, 8 and 9 is as follows:

The plug 169 or the liquid level gauge carried thereby is removed from the filler neck 166 and liquid oxygen is poured into the flask 160 until it is full or nearly full. As the apparatus may be warm, the evolution of oxygen is rapid for a short time until at least the interior portions of the flask 160 are chilled to the temperature of liquid oxygen. The valve 201 is then opened and the plug 169 and attached liquid level gauge are inserted in the filler neck 166 and made fast. The inflow of heat to the flask 160 which may be vacuum walled, if desired, is dependent upon ambient temperature but is substantially constant for the range of temperatures met with in practice. Accordingly, there is a gradual boiling away of the liquid oxygen within the flask 160 at a rate dependent upon the heat inflow into the storage flask.

Valve 201 is then closed but since pressure has not developed in the system, the bellows 183 is expanded and the venting tube 176 is closed by valve element 184. Consequently, a differential pressure develops in the vacuum flask 160 and causes liquid oxygen to rise in tube 175 and overflow directly into cylinder 178 where, due to the large sensible heat available, the liquid oxygen is quickly vaporized. The gaseous oxygen thus evolved builds up the pressure, not only in cylinder 178, but also throughout the entire system including cylinders 179 and 180 and flask 160 until sufficient to cause a contraction of the Sylphon bellows 183 thus opening vent tube 176. When so opened, tube 176 permits an equalization of pressure of cylinder 178 as compared with the pressure of flask 160 and liquid oxygen is therefore no longer raised in tube 175 and spilled over into cylinder 178.

The gradual evolution of oxygen maintains a pressure and if oxygen is not withdrawn at valve 201, the pressure will gradually increase until oxygen is vented at the over-pressure relief valve 200. Where oxygen is withdrawn through valve 201 at a rate greater than the minimum rate of evolution produced by the inflow of heat into flask 160, there is a consequent lowering of the pressure in the system and as the pressure reaches a predetermined adjustable minimum, depending upon the adjustment of Sylphon bellows 183, the vent tube 176 is again closed off by the action of valve 184. The differential pressure again builds up within the vacuum flask 160 causing the liquid oxygen to rise in tube 175 and thereby spilled into cylinder 178, again raising the pressure in accordance with the demand even though the demand is variable.

The cyclic operation continues more or less rapidly in accordance with the demand, however variable, until the liquid oxygen supply is exhausted at which time the flask 160 is again opened and refilled, or it may be refilled under pressure or at atmospheric pressure by the provision of suitable valves, inlets, etc., as herein described.

Where the apparatus illustrated in Figures 7 through 9 is used for military purposes, armor may be applied either to the outer box 150 or by making the flask 160 and the oxygen containing cylinders and tubular connections of heavy steel armor plate.

For refilling the apparatus with liquid oxygen, one may merely shut down operation for a short time by exhausting the gaseous oxygen. Thus in the apparatus shown in Figure 3, the gaseous oxygen may be exhausted at release valve 53 or 55 and then the liquid oxygen storage tank through filler neck 59.

In the apparatus shown in Figure 4, continuity of operation is possible by filling liquid oxygen while maintaining the pressure and hence the available supply of oxygen gas in the chamber 80.

In order to refill the apparatus of Figure 4, the 3-position valve 108 is moved to the position shown in Figure 6 thus closing the passageway 115 and consequently closing off flow of gas through that passage to the interior of flask 125. At the same time, the shut-off valve 137 is moved to the closed position thus blocking reverse flow of gaseous oxygen from the tank 90 to the interior of the flask 125. The liquid level gauge and plug 106 is then screwed out and liquid oxygen is poured into the filler neck 105 until the flask 125 is full or nearly full. The plug and liquid level gauge are then replaced and valve 133 opened and valve 108 moved to the operating position shown in Figure 4. It may be noted that over-pressure release valve 104 is provided on the filler neck 105 and during normal operations serves as an over-pressure release for the entire container since it not only directly vents the vacuum-wall flask 125, but also vents the oxygen pressure tank 90 by virtue of the normally opened connection to tube 133. There is, however, a small interval between the time cap 106 is screwed tight and valves 137 and 108 moved to their normal operating positions during which pressure may build up within the flask 125. The over-pressure release valve 104 thus serves, during this interval, to act as a direct vent for the vacuum flask 125.

Other methods of filling may also be used for any of the systems herein described. As illustrated in Figure 10, the liquid oxygen supply may be transferred from the extra supply vacuum storage flask 114 into flask 125 while the latter is under working pressure. This is accomplished by means of a simple permanent or temporary tubular connection 119 reaching from the bottom of the extra supply flask 114 and connected to valve 107 which is opened when the transfer is being made. The extra supply flask 114 is stoppered and a pressure is built up sufficient to overcome the working pressure in tank 125. This pressure in the extra supply flask can be built up by a pump or by generation of gaseous oxygen pressure by heat inflow or by applying heat to the inside of the flask as by a small electric heater element 118 which, being easily controllable by means of a switch or rheostat evaporates a small amount of oxygen, builds up a pressure in flask 114 and forces the liquid oxygen against the working pressure of tank 90 and into flask 125.

Many variations in the apparatus and method will be obvious to those skilled in the art and are deemed within the purview of the invention herein illustrated, described and claimed.

We claim as our invention:

1. An apparatus for converting oxygen from the liquid to the gaseous phase in accordance with a variable demand and under pressure comprising a pressure tank for storing the gaseous oxygen, a port in said pressure tank for drawing off the gaseous oxygen, a liquid oxygen storage tank within the pressure tank, insulating space around the liquid oxygen storage tank and means automatically responsive to a decrease in pressure of the gaseous oxygen within the pressure tank for transferring liquid oxygen directly from the liquid storage tank into the pressure tank for evaporation therein.

2. An apparatus for converting oxygen from the liquid to the gaseous phase in accordance with a variable demand and under pressure, comprising a pressure tank for storing the gaseous oxygen, a port in the pressure tank wall for withdrawing gaseous oxygen therefrom, a smaller liquid oxygen storage tank consisting of a vacuum-walled flask positioned within the pressure storage tank and having an access opening through the wall of the pressure storage tank, a vent passage between the interior of the flask and the interior of the pressure tank, a tube extending from the interior of the flask to the internal space between the flask and the pressure tank wall, and means automatically responsive to the pressure of the gaseous oxygen within the pressure tank for closing the vent passage when the pressure decreases to a predetermined minimum.

3. The apparatus set forth in claim 2 further characterized in that the pressure tank has a removable end lid which provides the principal mechanical support for the elements other than the pressure tank set forth in said claim.

4. An apparatus for converting oxygen from the liquid to the gaseous phase in accordance with a variable demand and under pressure comprising a pressure tank for storing the gaseous oxygen, a port in the pressure tank wall for withdrawing vapor oxygen therefrom, a relatively smaller liquid oxygen storage tank positioned in the interior of the pressure storage tank, a foraminous heat insulating covering for the liquid oxygen storage tank, a passageway from the interior of the liquid oxygen storage tank and above the liquid level thereof to a position adjacent the outer surface of said liquid oxygen storage tank and adjacent the inner surface of said insulating covering whereby cold gaseous oxygen may be delivered to the inner surface of the insulating material for outward filtration therethrough, and means responsive to decrease of gaseous oxygen pressure in the pressure tank for discharging liquid oxygen directly from the liquid oxygen storage tank to the pressure tank for direct evaporation therein.

5. The apparatus of claim 4 further characterized in that the means responsive to pressure changes in the pressure tank include a liquid oxygen delivery pipe from the interior of the liquid oxygen storage tank to the pressure tank, a valve in said passageway and means responsive to the gaseous oxygen pressure for closing the passageway when the pressure in the pressure tank decreases below a predetermined point.

6. An apparatus for converting oxygen from the liquid to the gaseous phase in accordance with a variable demand and under pressure comprising a pressure tank for storing gaseous oxygen, a port in the pressure tank wall for withdrawing gaseous oxygen therefrom, a relatively smaller liquid oxygen storage tank positioned in the interior of the pressure storage tank, a supporting frame having openings therein covering the walls of the liquid oxygen storage tank and spaced therefrom, a thick layer of insulating material over the frame forming an insulating covering for the liquid oxygen storage tank, a gaseous oxygen vent line from the liquid oxygen storage tank to the pressure tank, said line having an automatic valve therein, a liquid oxygen delivery line from the liquid oxygen storage tank to the pressure tank for delivering liquid oxygen thereto and means responsive to a decrease in gaseous oxygen below a predetermined point in the pressure tank for closing said automatic valve whereby increased pressure in the liquid oxygen storage tank causes discharge of liquid oxygen into the pressure tank for direct evaporation therein.

7. The combination set forth in claim 6 further characterized in that said valve and means responsive to the pressure in the pressure tank are located outside the pressure tank.

8. The apparatus set forth in claim 6 further characterized in that the pressure tank has a removable end lid to which there is attached the remaining elements set forth in said claim, except the pressure tank, so that said elements are removable from the tank when the end lid is removed.

9. An apparatus for converting oxygen from the liquid to the gaseous phase in accordance with a variable demand comprising a liquid oxygen storage tank and a gaseous oxygen storage tank, a valve line connecting the said tanks for conveying liquid oxygen from the liquid oxygen storage tank to the gaseous oxygen storage tank, and means responsive to the pressure of the gaseous oxygen for opening the line when the gaseous oxygen pressure decreases below a prescribed amount and for closing the line when the gaseous oxygen pressure increases above said predetermined value.

10. An apparatus for converting oxygen from the liquid to the gaseous phase in accordance with a variable demand comprising a liquid oxygen storage tank and a gaseous oxygen storage tank, a line for conveying liquid oxygen from the lower part of the liquid oxygen storage tank to the gaseous oxygen storage tank, a valve in said line for opening and closing the line, means responsive to the absolute pressure within the gaseous oxygen storage tank for opening said valve when the absolute pressure of the gaseous oxygen in the gaseous oxygen storage tank decreases below a predetermined minimum.

11. An apparatus for converting oxygen from the liquid to the gaseous phase in accordance with a variable demand comprising a liquid oxygen storage tank and a gaseous oxygen storage tank, a line for conveying liquid oxygen from the lower part of the liquid oxygen storage tank to the gaseous oxygen storage tank, a valve in said line for opening and closing the line, means including an airtight bellows responsive to the absolute pressure within the gaseous oxygen storage tank for opening said valve when the absolute pressure of the gaseous oxygen in the gaseous oxygen storage tank decreases below a predetermined minimum.

JOHN D. AKERMAN.
JEAN F. PICCARD.

REFERENCES CITED

The following references are of record in the file of this patent:

UNITED STATES PATENTS

| Number | Name | Date |
|---|---|---|
| 1,752,167 | Ford | Mar. 25, 1930 |
| 1,459,158 | Lisse | June 19, 1923 |
| 1,544,854 | Mueller | July 7, 1925 |
| 1,831,644 | Adair et al. | Nov. 10, 1931 |
| 1,493,183 | Backhaus | May 6, 1924 |
| 1,510,373 | Backhaus | Sept. 30, 1924 |
| 2,107,797 | Messer | Feb. 8, 1938 |

FOREIGN PATENTS

| Number | Country | Date |
|---|---|---|
| 708,002 | France | July 17, 1931 |